United States Patent [19]
Reinhart et al.

[11] Patent Number: 6,158,592
[45] Date of Patent: Dec. 12, 2000

[54] END PLATE FOR SPIN-ON FILTERS

[75] Inventors: David Matthew Reinhart, Mt Holly; Edward Allen Covington, Gastonia, both of N.C.

[73] Assignee: Dana Corporation, Toledo, Ohio

[21] Appl. No.: 09/302,303

[22] Filed: Apr. 30, 1999

[51] Int. Cl.[7] .................................................. B01D 27/08
[52] U.S. Cl. .................. 210/443; 210/450; 210/DIG. 17
[58] Field of Search .................................... 210/440, 443, 210/444, 453, 455, DIG. 17, 435, 450

[56] References Cited

U.S. PATENT DOCUMENTS

| | | |
|---|---|---|
| 3,411,632 | 11/1968 | Offer et al. . |
| 3,616,933 | 11/1971 | Baldwin . |
| 4,324,660 | 4/1982 | Peyton et al. . |
| 4,473,471 | 9/1984 | Robichaud et al. . |
| 5,182,015 | 1/1993 | Lee . |
| 5,453,195 | 9/1995 | Jorensen et al. . |

*Primary Examiner*—Matthew O. Savage
*Attorney, Agent, or Firm*—Millen, White, Zelano & Branigan

[57] ABSTRACT

A high pressure spin-on filter cartridge utilizes an end plate which is strengthened by four substantially triangular shaped gussets which project from an annular U-shaped bridge that supports an internally threaded hub member. The internally threaded hub member provides an outlet for the filter cartridge while a plurality of radially positioned inlet openings are positioned between the gussets. The gussets extend radially past a sealing gasket that seals the spin-on filter canister with a machine on which it is mounted.

5 Claims, 2 Drawing Sheets

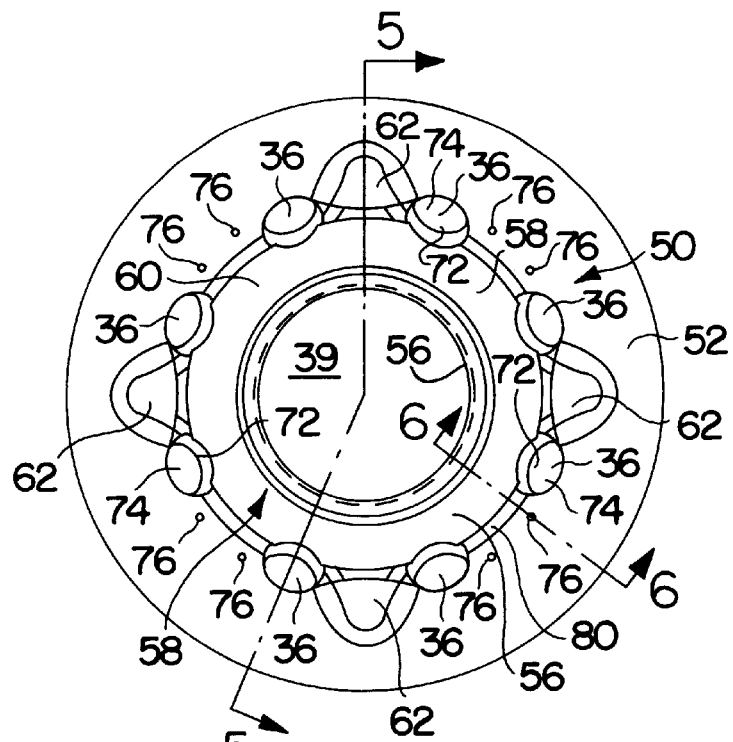
FIG.4
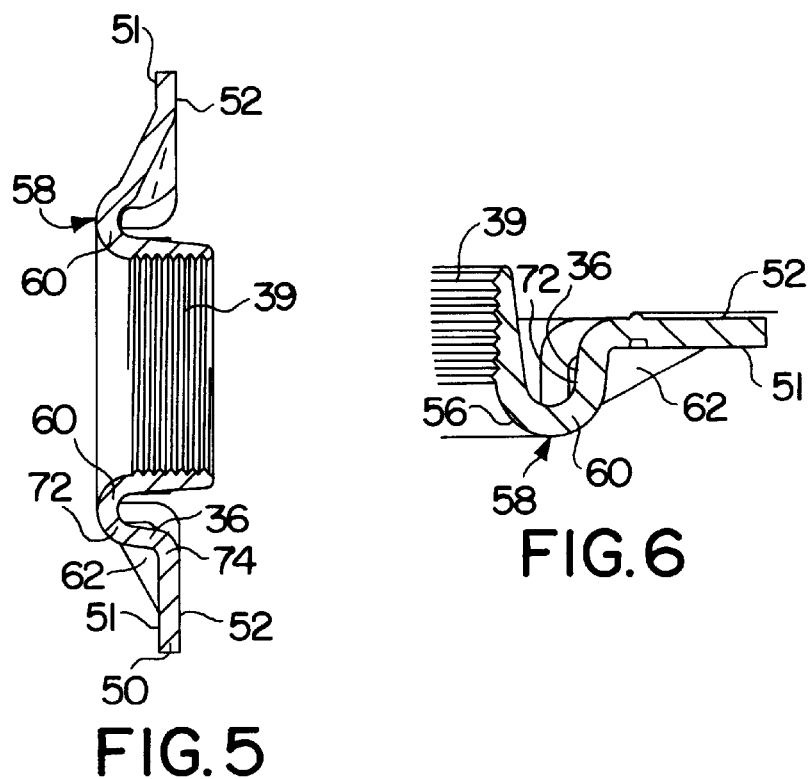
FIG.5
FIG.6

END PLATE FOR SPIN-ON FILTERS

FIELD OF THE INVENTION

The present invention relates to end plates for spin-on filters, and more particularly, the present invention relates to end plates for spin-on filters which are configured to withstand increased fluid pressure.

BACKGROUND OF THE INVENTION

Spin-on type filters are used to filter lubricating oil and hydraulic oil for devices such as engines, air compressors, various types of hydraulic machines, and the like. Generally, spin-on filters have deep drawn, sheet metal canisters in which an annular filter element is disposed, which filter element is retained by an end plate that is in turn secured within the canister by an annular metal cover. In addition to holding the annular filter element in the canister, the end plate provides a flow path to and from the filter element, and includes a central threaded aperture so that it may be "spun on" or threaded to the machine or engine with which it is used.

For some applications, such as hydrostatic transmissions, a filter must be capable of withstanding continuous cyclic pressure surges of up to 500 psi or sustain periods without fatigue failure and leakage. This means that the burst pressure must be increased for such applications.

High performance filters also require large outlet ports through the end plate and as a result, only a relatively small end plate area remains outboard of the outlet port. That area is perforated to form inlet ports which can further compromise the strength of an end plate. This has resulted in the use of expensive die cast aluminum end plates, which require high tooling costs, and high costs for maintaining the tooling. In addition, there are relatively long manufacturing cycle rates and significant secondary machinery associated with manufacturing such end plates.

Accordingly, there is a need for end plates which increase the burst pressure of a standard welded plate/cover spin-on filter cartridges without a major increase in plate thicknesses and expense.

SUMMARY OF THE INVENTION

In view of the aforementioned considerations, it is a feature of the present invention to provide a new and improved end plate for high pressure spin-on filter cartridges.

In view of this feature and other features, the present invention is directed to an end plate adapted for use in a spin-on filter cartridge having a canister containing a filter media therein, wherein the canister has a closed end and an open end, the open end being covered by the end plate. The end plate comprises a substantially annular disk having an inner face for facing into the canister and an outer face for facing away from the canister. The disk includes a centrally disposed hub having a threaded interior for mounting the spin-on filter cartridge. The centrally disposed hub is spaced from the planar portions of the annular disk and connected thereto by an annular bridge which has portions which are U-shaped in cross-section and are spaced from one another by radially extending gussets. Openings through the end plate provide fluid communication with the interior of the canister.

In a further aspect of the invention, the openings through the end plate intersect both the U-shaped annular bridge and flat portions of the annular disk.

In still a further aspect of the invention, the end plate is in combination with a spin-on filter which comprises a canister having a closed end and an open end with an annular filter media supported therein by the end plate.

BRIEF DESCRIPTION OF THE DRAWINGS

Various other features and attendant advantages of the present invention will be more fully appreciated as the same becomes better understood when considered in conjunction with the accompanying drawings, in which like reference characters designate the same or similar parts through the several views, and wherein:

FIG. 4 is a planar view of the end plate of FIG. 3 taken from the interior of the filter cartridge of FIG. 1;

FIG. 5 is a side elevation of the end plate of FIG. 4 taken along lines 5—5 of FIG. 4, and FIG. 6 is an enlarged side elevation of a portion of the end plate of FIGS. 3–5 taken along lines 6—6 of FIG. 4.

DETAILED DESCRIPTION

Figure 1:
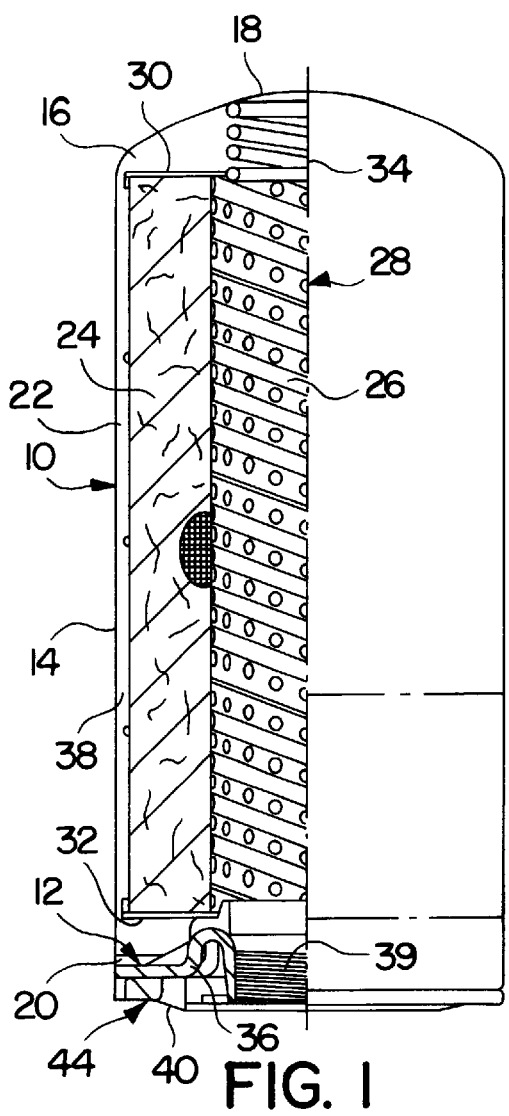
FIG. 1 is a side view, partially in elevation, showing a filter cartridge configured in accordance with the principles of the present invention.

Referring now to FIG. 1, there is shown a filter cartridge 10 configured in accordance with the principles of the present invention in that it includes an end plate 12 having features of the present invention. The filter cartridge 10 includes a canister 14 having a closed end 16 which is closed by a domed end portion 18 and an open end 20 which is closed by the end plate 12. Within the canister 14, there is positioned an annular filter element 22 comprised of a filter media 24 defining a hollow core 26 within a perforated cylindrical support 28. Filter media 24 has an upper end cap 30 and a lower end cap 32 and is urged toward the end plate 12 by a coil spring 34. The coil spring 34 bearing against the plate 30 urges the filter element 22 into engagement with a filter element support which abuts the end plate 12.

In operation, a fluid being filtered enters the canister through a plurality of radially disposed input ports 36 into an annular space 38 around the filter element 22 and then passes through the filter media 24 into the hollow core 26. The fluid then returns to the machine using the fluid through a threaded central outlet 39.

It is emphasized that the filter cartridge 10 may be used for numerous purposes, such as but not limited to, air compressors, lubricating oil filters for engines, hydraulic filters for devices such as hydrostatic transmissions and any other situation in which it is desirable to have a spin-on type filter cartridge with an enhanced pressure capacity.

Figure 2:
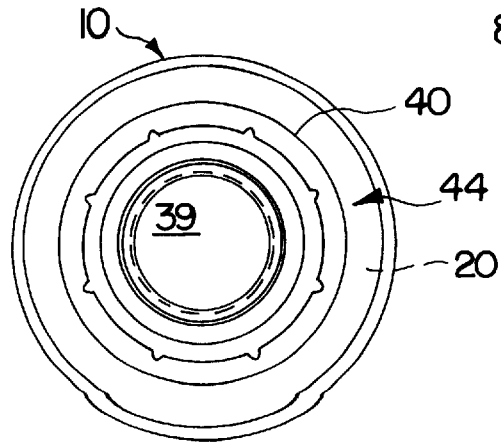
FIG. 2 is a bottom view of the filter cartridge of FIG. 1.

Referring now to FIG. 2, in combination with FIG. 1, there is shown a bottom view of the filter cartridge in accordance with the present invention wherein the outlet 39 is surrounded by an annular sealing gasket 40. The annular sealing gasket 40 is retained within a groove in an annular cover 44 that is crimped at its periphery with the open end 20 of the canister 14. In accordance with the present invention, the annular sealing gasket 40 is disposed closer to the central outlet 39 in the plate 12 that is the case with prior art configurations. For example, the gasket 40 has an inner diameter of about 3.0 inches and an outer diameter of about 3.4 inches with the opening 39 having a diameter of about 1.9 inches. The filter plate 12 has an overall diameter of about 4.6 inches.

Referring now mainly to FIGS. 3–6 which illustrate the end plate 12 in further detail, the end plate is in the shape of a substantially annular disk having an annular flat disk portion 50 with an inside face 51 and an outside face 52. The inside face 51 is seen in planar view in FIG. 3 while the outside surface 52 is seen in planar view in FIG. 4.

Disposed between the annular flat disk portion 50 of the end plate and the central outlet opening 39 is a hub portion 56. The hub portion 56 is connected to the annular flat disk portion 50 by an annular bridge 58.

Figure 3:
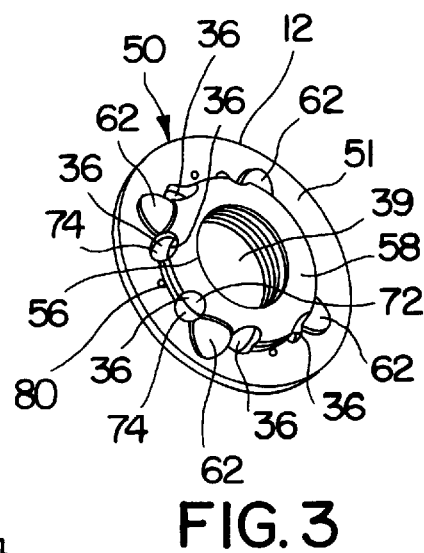
FIG. 3 is a perspective view of an end plate configured in accordance with the principles of the present invention and used in the cartridge of FIG. 1.

The annular bridge 58 has a U-shaped portion 60 (see mainly FIGS. 5 and 6) from which depend four gussets 62. The four gussets 62 are spaced 90° apart, and are substantially triangular in shape extending outwardly from the annular bridge 58 in a radial direction. When viewed from the inside in the direction of inside surface 51, as seen in FIG. 3, the gussets 62 are convex and when viewed from the outside, in the direction of outside surface 52 (see FIG. 4) the gussets are concave. The gussets 62 strengthen the hub portion 56 and annular bridge 58 so as to increase burst pressure of the cartridge 10 from, for example, about 650 psi to about 730 psi. As is seen in FIG. 1, the annular sealing gasket 40 is bridged by the radially extending gussets 62 with the gussets being positioned closer to the threaded outlet opening 39 than in prior art configurations.

Disposed between adjacent gussets 62 are pairs of inlet openings 36, each of which has a portion 72 within the U-shaped portion 58 of the hub 56 and a portion 74 through the flat annular flange portion 50. As is seen in FIGS. 3 and 6, the inlet openings 36 are directly adjacent each of the gussets 62 so that the end plate is strengthened by the gussets at locations where the U-shaped bridge 56 may have been weakened by the inlet openings 36. The openings 36 extend through a substantially circular intersection 80 between the hub portion 56 and the flange portion 50 so as to extend through both the hub portion and flange portion.

In a preferred embodiment the end plate 12 is made of steel which for example may be about 0.155 inch thick. The final diameter of the end plate 12 in the preferred embodiment is about 4.590 inches. While these dimensions and the steel material exemplify one use of the invention, it is to be kept in mind that the principles of the invention apply to end plates of other dimensions and materials.

Pairs of weld projections 76 are disposed between each of the openings 70 for welding with the cover 44 (see FIGS. 1 and 2) during assembly.

From the foregoing description, one skilled in the art can easily ascertain the essential characteristics of this invention, and without departing from the spirit and scope thereof, can make various changes and modification of the invention to adapt it to various usages and conditions.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

We claim:

1. A spin-on filter comprising:
    a canister having a closed end and an open end;
    an annular filter media within the canister;
    an end plate for supporting the filter media within the housing; the end plate comprising:
        a substantially annular disk portion having an inner face for facing into the canister and an outer face for facing away from the canister;
        a centrally disposed annular hub portion within the disk portion for providing fluid communication with the interior of the canister, the disk portion having a threaded interior surface for mounting the spin-on filter cartridge and being spaced from the annular disk,
        an annular bridge which is substantially U-shaped in cross-section, the annular bridge connecting the hub portion to the disk portion along a substantially circular intersection;
        a plurality of spaced apart gussets extending radially from the annular bridge into the disk portion, and
        openings through the end plate providing fluid communication with the interior of the canister, the openings extending through the substantially circular intersection so as to occur in both the hub portion and disk portion;
    an annular end cover over the end plate for retaining the end plate within the canister, and
    an annular seal retained in the annular cover, the annular seal having a diameter less than the radial extent of the gussets whereby the gussets extend past the annular seal.

2. The spin on filter cartridge of claim 1, wherein there are four gussets and wherein there is an opening through the end plate adjacent to each gusset.

3. The spin on filter cartridge of claim 2, wherein there are two openings through the end plate for each gusset, the openings being adjacent to and on opposite sides of each gusset.

4. The spin on filter cartridge of claim 3, wherein the gussets are substantially triangular in shape and taper to decrease in width in an outwardly radial direction.

5. The spin on filter cartridge of claim 1, wherein the gussets are substantially triangular in shape and taper to decrease in width in an outwardly radial direction.

* * * * *